(12) United States Patent
Schmidt (10) Patent No.: US 11,964,777 B2
(45) Date of Patent: Apr. 23, 2024

(54) REMOTE AIRCRAFT TOWING INTERFACE

(71) Applicant: Safran Landing Systems Canada Inc., Ajax (CA)

(72) Inventor: Robert Kyle Schmidt, Brooklin (CA)

(73) Assignee: Safran Landing Systems Canada Inc., Ajax (CA)

( * ) Notice: Subject to any disclaimer, the term of this patent is extended or adjusted under 35 U.S.C. 154(b) by 445 days.

(21) Appl. No.: 17/037,133

(22) Filed: Sep. 29, 2020

(65) Prior Publication Data

US 2022/0097868 A1    Mar. 31, 2022

(51) Int. Cl.
*B64F 1/22* (2006.01)
*B64F 1/223* (2024.01)
*B64F 1/228* (2024.01)

(52) U.S. Cl.
CPC .............. *B64F 1/228* (2013.01); *B64F 1/224* (2013.01)

(58) Field of Classification Search
CPC ........... B64F 1/228; B64F 1/224; B64F 1/225
See application file for complete search history.

(56) References Cited

U.S. PATENT DOCUMENTS

| | | | | |
|---|---|---|---|---|
| 3,709,522 A * | 1/1973 | Olson | .................. | B60D 1/155 280/475 |
| 4,113,041 A * | 9/1978 | Birkeholm | ................ | B64F 1/22 244/50 |
| 6,675,920 B1 * | 1/2004 | Diez | ........................ | B60T 8/00 303/3 |
| 6,746,037 B1 * | 6/2004 | Kaplenski | ................ | B60D 1/50 280/483 |
| 9,108,746 B2 | 8/2015 | Schmidt et al. | | |
| 10,166,826 B2 * | 1/2019 | Gray | ....................... | B64F 1/225 |
| 10,549,848 B2 | 2/2020 | Klim et al. | | |
| 10,926,796 B1 * | 2/2021 | Beech | ..................... | B60D 1/62 |
| 11,198,519 B1 * | 12/2021 | Seeley | ..................... | B64F 1/31 |
| 2002/0098069 A1 * | 7/2002 | Stahancyk | ............. | B64F 1/224 244/50 |

(Continued)

FOREIGN PATENT DOCUMENTS

| | | | |
|---|---|---|---|
| CA | 2 801 626 A1 | 12/2011 | |
| DE | 102019117241 A1 * | 12/2020 | ............. B64F 1/225 |

(Continued)

OTHER PUBLICATIONS

International Search Report and Written Opinion dated Dec. 16, 2021, issued in corresponding International Application No. PCT/CA2021/051333, filed Sep. 24, 2021, 13 pages.

*Primary Examiner* — Donald J Wallace
*Assistant Examiner* — Jalal C Coduroglu
(74) *Attorney, Agent, or Firm* — CHRISTENSEN O'CONNOR JOHNSON KINDNESS PLLC (57) ABSTRACT

A remote towing interface is used to couple a towbar to an aircraft having a fuselage and a steerable landing gear. The remote towing interface includes a towbar coupler mounted to the aircraft and configured to releasably couple a towbar to the aircraft. The remote towing interface further includes a sensor and a controller. The sensor is configured to sense a position of the towbar relative to the aircraft when the towbar is coupled to the towbar coupler, and the controller controls the steerable landing gear according to the sensed position of the towbar relative to the aircraft.

13 Claims, 7 Drawing Sheets

(56) References Cited

U.S. PATENT DOCUMENTS

| | | | |
|---|---|---|---|
| 2005/0007257 A1* | 1/2005 | Rast | G02B 27/017 |
| | | | 340/815.45 |
| 2008/0089766 A1* | 4/2008 | Hammonds | B64F 1/22 |
| | | | 244/50 |
| 2009/0205908 A1* | 8/2009 | Hammonds | B64F 1/22 |
| | | | 180/6.58 |
| 2011/0280698 A1* | 11/2011 | Hammonds | B62D 53/045 |
| | | | 414/495 |
| 2012/0032689 A1 | 2/2012 | Phillips et al. | |
| 2012/0091692 A1* | 4/2012 | Moore | B64F 1/224 |
| | | | 403/345 |
| 2012/0326894 A1 | 12/2012 | Schmidt et al. | |
| 2014/0072393 A1* | 3/2014 | Hammonds | B64F 1/227 |
| | | | 414/427 |
| 2014/0161579 A1* | 6/2014 | McElroy | B64F 1/224 |
| | | | 280/475 |
| 2016/0083113 A1* | 3/2016 | Schramm | B64F 1/224 |
| | | | 701/33.9 |
| 2021/0380276 A1* | 12/2021 | Daneshvaran | B64C 25/001 |
| 2022/0097868 A1* | 3/2022 | Schmidt | B64F 1/228 |

FOREIGN PATENT DOCUMENTS

| | | | | |
|---|---|---|---|---|
| JP | 2004224304 A | * | 8/2004 | |
| SE | 501788 C2 | * | 5/1995 | B64F 1/224 |
| SE | 501788 C2 | * | 5/2006 | B64F 1/22 |
| WO | WO-2008139440 A2 | * | 11/2008 | B64C 25/50 |
| WO | WO-2017184699 A1 | * | 10/2017 | B60D 1/02 |

* cited by examiner

REMOTE AIRCRAFT TOWING INTERFACE

BACKGROUND

Towing vehicles, such as tugs or tractors, are often utilized to push or pull aircraft during ground maneuvers. In addition to providing a motive force to drive the aircraft without the need for engine thrust, the use of towing vehicles also provides improved maneuverability. During towing operations, the towing vehicle is temporarily coupled to the aircraft by an elongate towbar to transfer motive force from the towing vehicle to the aircraft.

Some aircraft are not compatible with standard towbars and must use their own, special towbars. These aircraft generally fly with their own towbars onboard, adding weight and occupying cargo space. Other aircraft types do not lend themselves easily to the use of towbars for ground maneuvers. For example, aircraft with dual nose landing gears can be problematic because steering the dual nose landing gear wheels would require a mechanical connection between the two nose gears, i.e., a specialized towbar that connects to both nose gears. Still other aircraft, such as low boom supersonic aircraft, have limited clearance underneath the fuselage, which precludes the use of standard towbars. For these aircraft, a normal towbar connection can be made; however, the required towbar length would make the towbar susceptible to buckling during pushing operations.

SUMMARY

Embodiments of a disclosed remote towing interface for an aircraft provide improved accessibility to connect a towbar and towing vehicle to an aircraft to facilitate ground maneuvers. The towing interface is typically located forward of the nose landing gear, providing improved accessibility. When the towing vehicle pushes or pulls the aircraft through a turn, the remote towing interface senses the angle of the towbar relative to the aircraft and controls the nose landing gear(s) to maintain a steering angle corresponding to the sensed towbar angle.

A first embodiment of a towing interface according to the present disclosure is configured for use with an aircraft having a fuselage and a steerable landing gear. The remote towing interface comprises a towbar coupler mounted to the aircraft, the towbar coupler being configured to releasably couple a towbar to the aircraft. The remote towing interface further comprises a sensor configured to sense a position of the towbar relative to the aircraft when the towbar is coupled to the towbar coupler; and a controller operably coupled to the sensor. The controller controls the steerable landing gear according to the sensed position of the towbar relative to the aircraft.

In any embodiment, the towing interface further comprises an elongate member mounted at one end to the aircraft, wherein the towbar coupler is disposed on a second end of the elongate member.

In any embodiment, the elongate member is fixed in rotation about a vertical axis relative to the aircraft fuselage.

In any embodiment, the elongate member is selectively rotatable between a stowed position and a deployed position.

In any embodiment, the elongate member is coupled to a fuselage of the aircraft at a location forward of the steerable landing gear.

In any embodiment, the steerable landing gear is a nose landing gear.

In any embodiment, an angle of the towbar to the aircraft centerline defines a first turn angle, and an angle of the steerable landing gear relative to the aircraft centerline defines a second turn angle, wherein the controller controls the second turn angle according to the first turn angle.

In any embodiment, the controller controls the second turn angle according to the first turn angle so that the towbar and the steerable landing gear have a common turn center.

In any embodiment, the remote towing interface is configured to provide power to an actuator that steers the nose landing gear.

In any embodiment, the controller is programmed to limit the orientation of the nose landing gear to be within a predetermined range.

In any embodiment, the remote towing interface further comprises a biasing element configured to bias the coupler toward a neutral position.

A second representative embodiment of a towing interface according to the present disclosure is configured for use with an aircraft having a fuselage, a landing gear, and an actuator configured to steer the landing gear. The remote towing interface comprises an elongate member mounted at a first end to the fuselage forward of the steerable landing gear. The elongate member extends forward from the first end and being fixed in rotation about a vertical axis relative to the fuselage. The remote towing interface further comprises a towbar coupler mounted to a second end of the elongate member, the towbar coupler being configured to releasably couple a towbar to the elongate member; a sensor configured to sense a position of the towbar relative to the aircraft when the towbar is coupled to the towbar coupler; and a controller operably coupled to the sensor. The controller controls the steerable landing gear according to the sensed position of the towbar relative to the aircraft.

In some embodiments, an angle of the towbar to the aircraft centerline defines a first turn angle, and an angle of the steerable landing gear relative to the aircraft centerline defines a second turn angle, wherein the controller controls the second turn angle according to the first turn angle.

In some embodiments, the controller controls the second turn angle according to the first turn angle so that the towbar and the steerable landing gear have a common turn center.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the disclosed subject matter will become more readily appreciated as the same become better understood by reference to the following detailed description, when taken in conjunction with the accompanying drawings, wherein.

DETAILED DESCRIPTION

Figure 1:
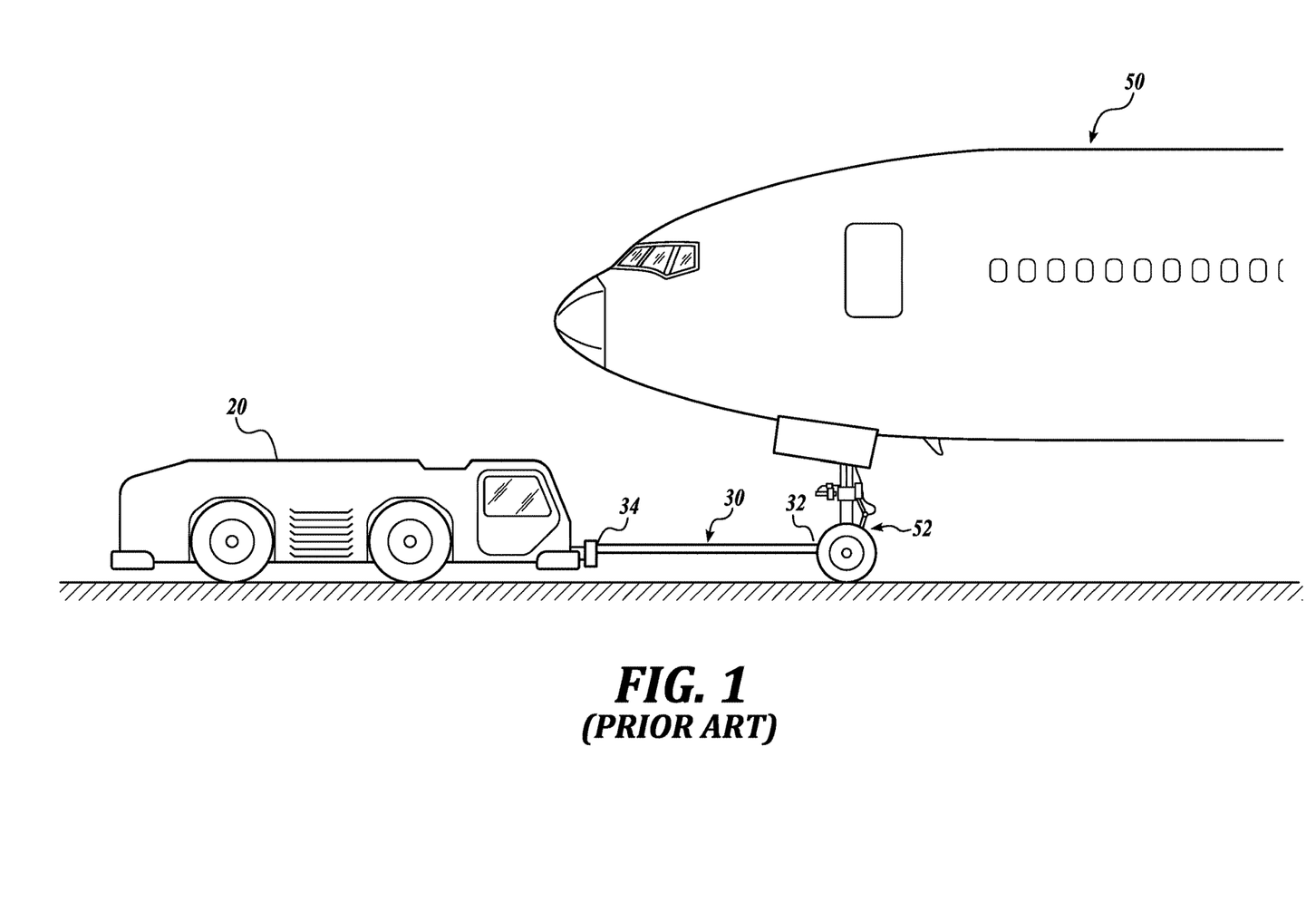
FIG. 1 is a side view of a tow vehicle towing an aircraft using a known towbar configuration.
Figure 2:
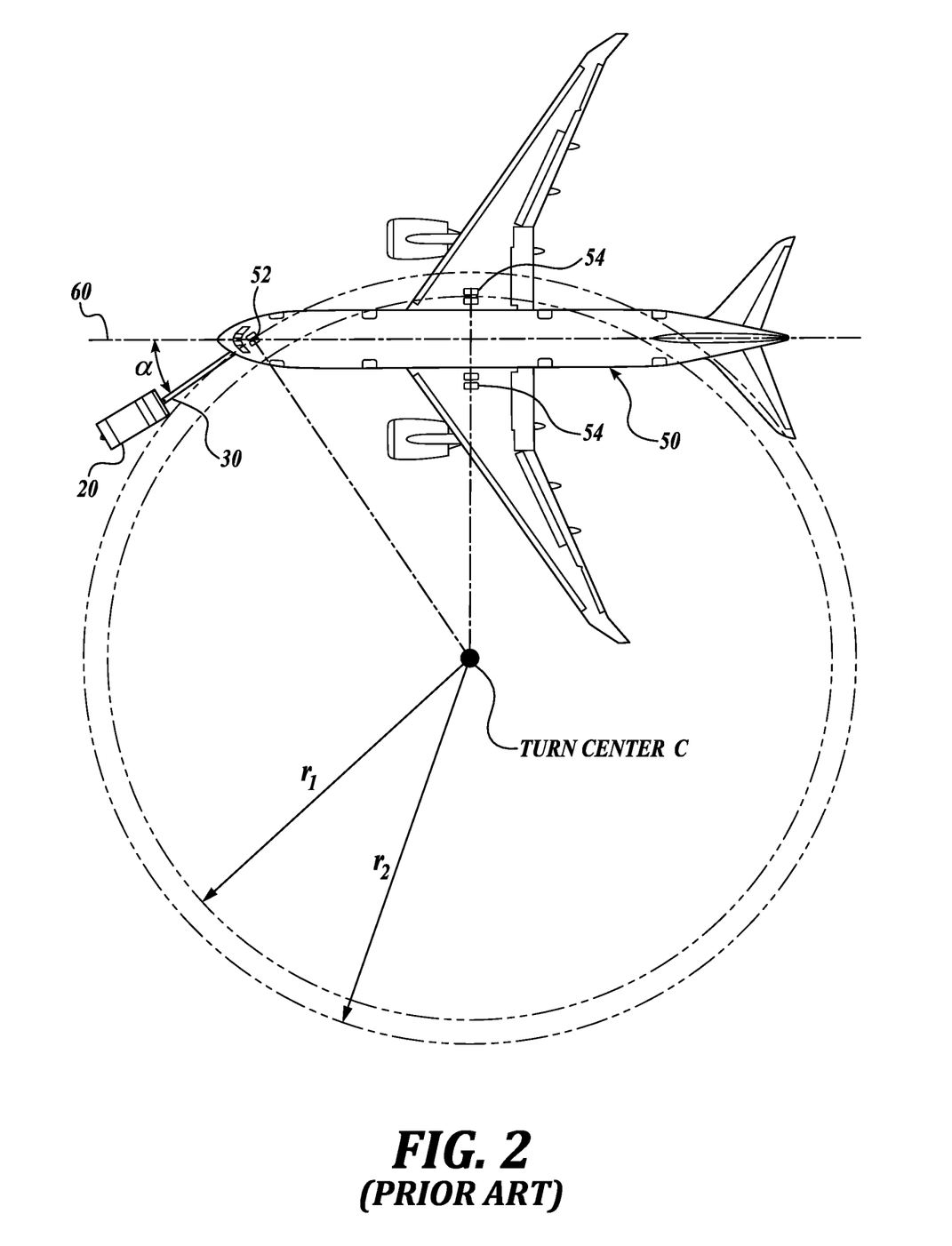
FIG. 2 is a plan view of the tow vehicle and aircraft of shown in FIG. 1, wherein the tow vehicle is turning the aircraft.

A known towbar arrangement is shown in FIGS. 1 and 2. As best shown in FIG. 1, a first end 32 of a towbar 30 is temporarily coupled to the nose landing gear 52 of an aircraft 50. A configuration for attaching a towbar to the nose gear of an aircraft is shown in U.S. Pat. No. 9,108,746, "Method of Protecting and Aircraft Landing Gear While the Aircraft is Being Towed, and Pin for Coupling a Towing Bar to an Orientable Lower Part of a Landing Gear," issued Aug. 18, 2015, to Schmidt et al., and currently assigned to Safran Landing Systems, the disclosure of which is expressly incorporated herein. Still referring to FIG. 1, a second end 34 of the towbar 30 is rotatably coupled to the towing vehicle. The towbar 30 has a rigid configuration that transfers both pushing and pulling forces from the towing vehicle 20 to the nose landing gear 52 to enable the towing vehicle to maneuver the aircraft 50.

When the aircraft 50 is not connected to a towing vehicle 20, the nose landing gear 52 is steerable. Typically, an actuator is operatively coupled to the nose landing gear 52 to selectively steer the landing gear in response to input from the flight deck. When the aircraft is being towed on the ground, as shown in FIGS. 1 and 2, steering control of the landing gear 52 is deactivated so that the nose gear turns freely with the towbar 30.

As best shown in FIG. 2, to turn the aircraft 50, an operator turns the towing vehicle 20, which rotates the towbar 30 relative to the centerline 60 of the aircraft 50. Because the towbar 30 is coupled to the nose landing gear 52, rotation of the towbar rotates the nose landing gear to match the angle α of the towbar relative to the centerline 60 of the aircraft 50. The main landing gears 54 maintain a generally fixed orientation relative to the centerline 60 of the aircraft 50.

When the aircraft 50 is driven forward or backwards with the nose landing gear 52 at an angle α, the aircraft turns around a turn center C. The turn center C is defined by the intersection of the line through the main landing gears and the axle centerline of the nose landing gear 52. The airplane, and thus, the main landing gears and the nose landing gear, turn around the common turn center C, however, because of the geometry of the aircraft 50, the nose landing gear 52 and the main landing gear 54 travel along arcuate paths with different radii. In the illustrated embodiment, the nose landing gear 52 travels along a path with a first radius $r_1$, and the right main landing gear 52 travels along a path with a second radius $r_2$, wherein $r_1 < r_2$. In the illustrated embodiment, the left main landing gear 52 travels along a path (not shown) with a radius that is less than both $r_1$ and $r_2$.

FIGS. 3-6 show a first representative embodiment of a towbar interface 100 that enables remote towbar attachment, i.e., away from the nose landing gear, while still providing steering capability to the nose landing gear.

Figure 3:
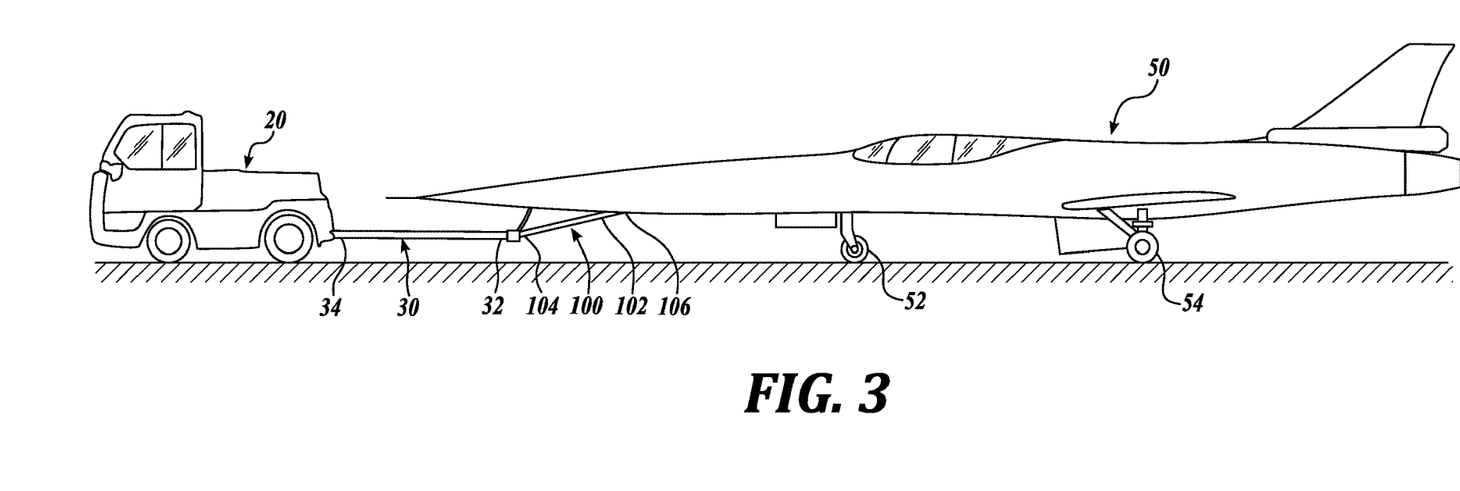
FIG. 3 is a side view of a tow vehicle towing an aircraft with a first representative embodiment of a towing interface according to the present disclosure.
Figure 4:
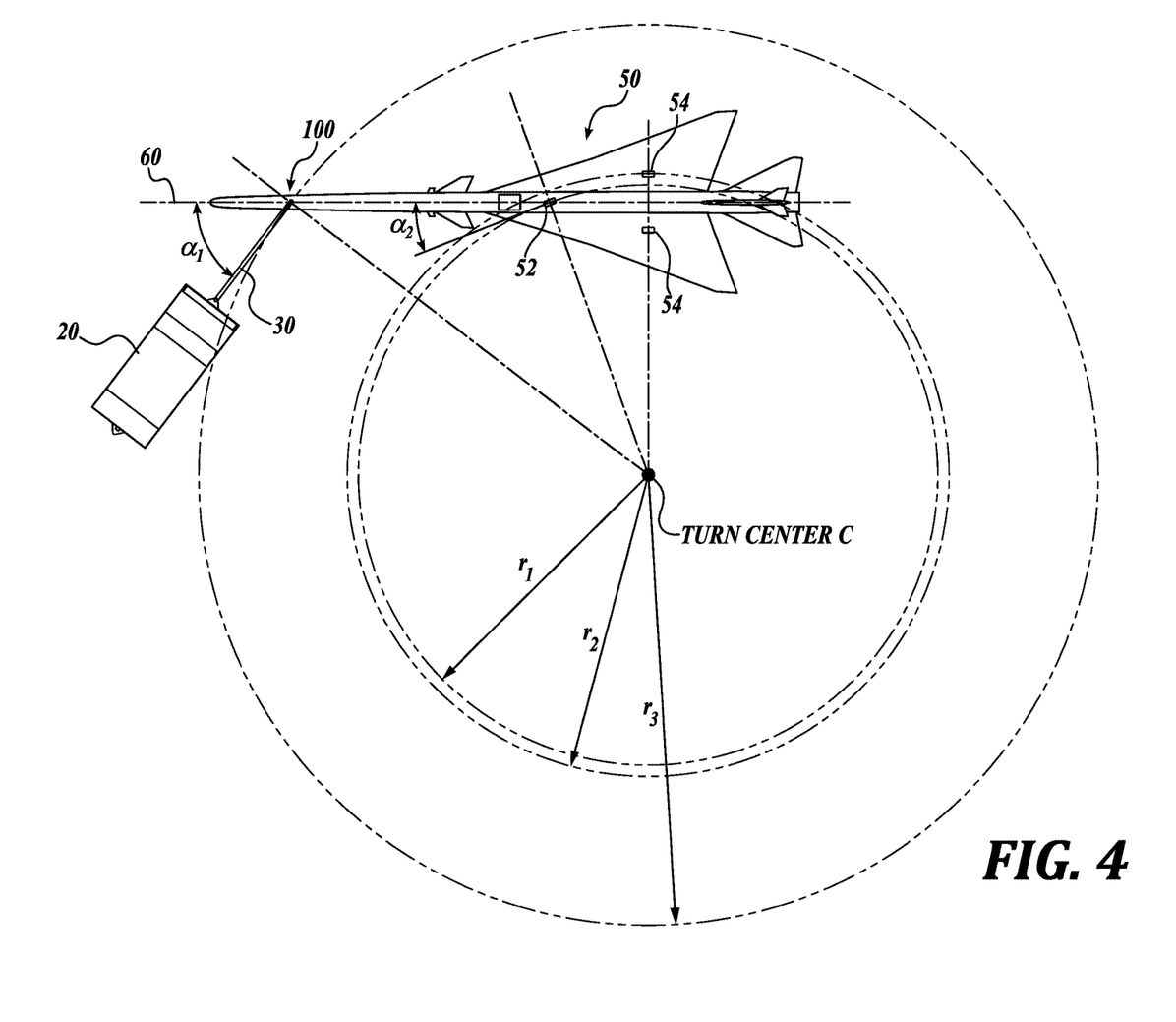
FIG. 4 is a plan view of the tow vehicle and aircraft of shown in FIG. 3, wherein the tow vehicle is turning the aircraft.

Referring to FIGS. 3 and 4, an aircraft 50 includes a fuselage supported by a steerable nose landing gear 52 and a pair of main landing gear 54 positioned aft of the nose landing gear. In the illustrated embodiment, the main landing gears 54 are symmetrically positioned about the centerline 60 of the aircraft 50. The aircraft 50 includes a towbar interface 100 positioned forward of the nose landing gear 52.

In the illustrated embodiment, the towbar interface 100 includes an elongate element or member 102 with a first end 104 configured for detachable coupling to a towbar 30 and a second end 106 coupled to the fuselage of the aircraft 50. The elongate member 102 extends from the fuselage in a downward and forward direction. In some embodiments, the elongate member 102 is mounted to the fuselage for reciprocating movement between a stowed position, in which the elongate member 102 is at least partially disposed within the fuselage, and a deployed position, shown in FIG. 3. In some embodiments, the elongate member 102 is coupled to the aircraft 50 while on the ground and then decoupled prior to takeoff. These and other configurations for coupling the elongate member 102 are contemplated and should be considered within the scope of the present disclosure.

Referring to FIG. 4, when the towing vehicle 20 is pushing or pulling the aircraft 50 through a turn, the aircraft turns around a turn center C. The turn center C is defined by the intersection of the line through the main landing gears 54, which maintain a generally fixed orientation relative to the centerline 60 of the aircraft 50, and a line normal to the towbar 30 at the towbar interface 100. Because the towbar interface 100 is forward of the nose landing gear 52, the towbar interface controls the angle $α_2$ of the nose landing gear 52 relative to the aircraft centerline 60 less than the angle $α_1$ of the towbar 30 relative to the aircraft centerline 60 so that the axis of the nose landing gear 52 passes through the turn center C, thereby ensuring that the nose landing gear wheels roll freely in the direction of the turn without undesirable side loads.

In the illustrated embodiment, the nose landing gear 52 travels along a path with a first radius $r_1$, and the right main landing gear 52 travels along a path with a second radius $r_2$, wherein $r_1 < r_2$. The left main landing gear 52 travels along a path (not shown) with a radius that is less than both $r_1$ and $r_2$. The attachment point of the towbar 30 to the towbar interface 100 travels along a path with a third radius $r_3$, which is greater than both $r_1$ and $r_2$.

Figure 5:
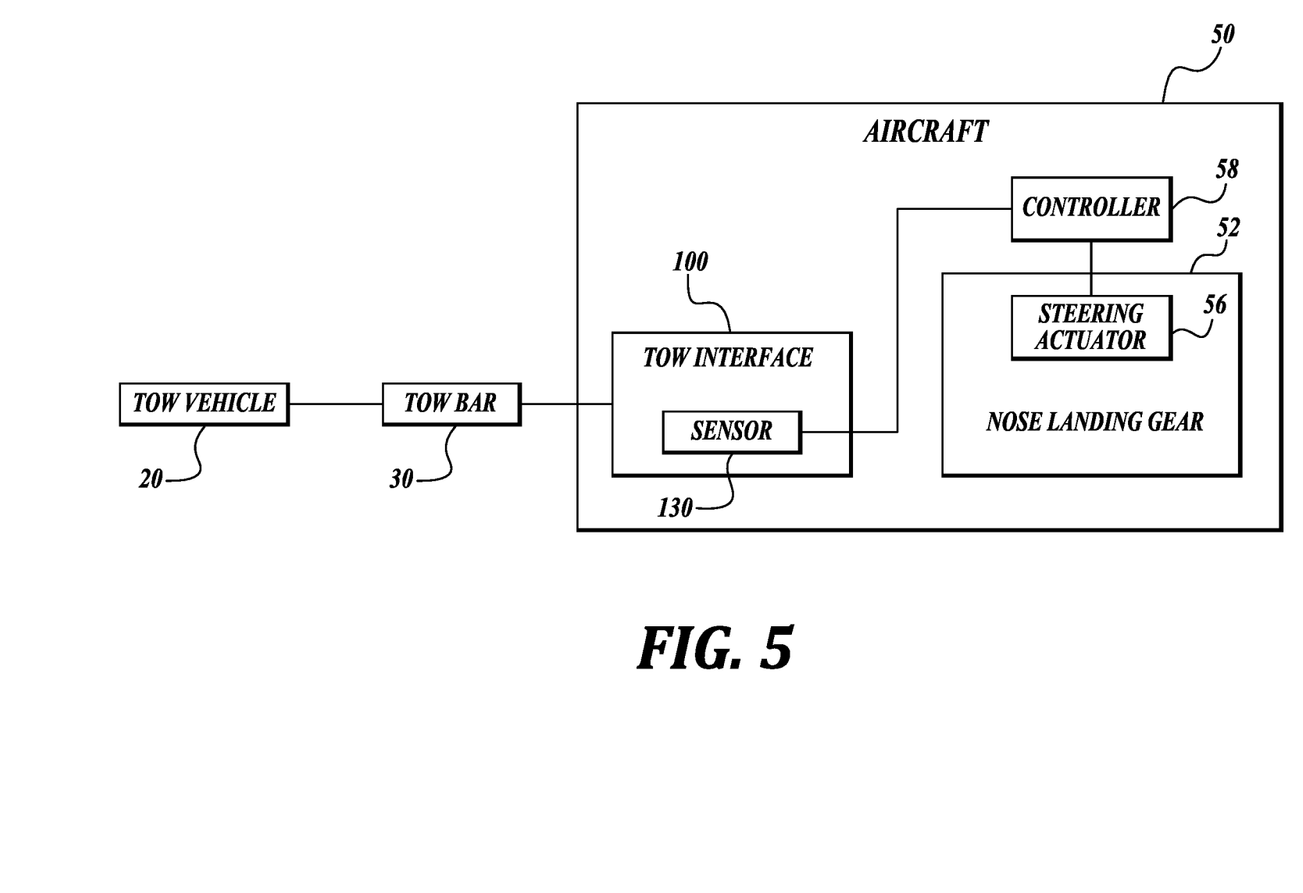
FIG. 5 is a schematic view of a representative embodiment of the towing interface shown in FIG. 3.

Referring now to FIG. 5, a schematic view of the aircraft 50 and towbar interface are shown. The aircraft 50 includes a nose landing gear 52 and a steering actuator 56 configured to selectively rotate the nose landing gear. In some embodiments, the steering actuator 56 is an electrical motor, a hydraulic actuator, or any other suitable device for controlling the orientation of the nose landing gear 52.

A controller 58 (e.g., a programmed microprocessor, a FPGA, an ASIC, an arrangement of digital and/or analog circuits, etc.) is communicatively coupled to the steering actuator 56 and is programmed to selectively control steering actuator 56 and, therefore, the orientation of the nose landing gear 52. The controller 58 is configured to receive signals from a nose wheel steering system that enables a pilot to steer from the flight deck during unassisted ground operation, i.e., when the aircraft 50 is not being towed.

The controller 58 is also communicatively coupled to a sensor 130. The sensor 130 senses the angle $α_1$ of the towbar 30 relative to the aircraft centerline 60 as shown in FIG. 4. In some embodiments, the sensor 130 is a rotary position sensor that senses an angle between the towbar 30 and the elongate element 102 of the towbar interface 100. In some embodiments, the sensor 130 may include one or more of a shaft encoder, a potentiometer, a resolver, a photosensor, sonic rangefinders, and a laser measurement device. It will be appreciated that any suitable type and/or number of sensors may be utilized to determine the angle $\alpha_1$ of the towbar 30 relative to the aircraft centerline 60, either directly or indirectly, and such embodiments should be considered within the scope of the present disclosure.

In some embodiments, additional copies of the controller 58, the sensor 130 and/or other components may be provided for redundancy. Further, the components of the aircraft 50 and the towbar interface 100 may be communicatively coupled via any suitable communication technique, including but not limited to serial wired communication, wireless communication (via Bluetooth, Wi-Fi, or other wireless communication techniques), and/or networked wired communication (via USB, Ethernet, CANBUS, or other wired communication techniques).

During a towing operation, the controller 58 receives signals from the sensor 130 and controls (e.g., generated and transmits suitable control signals to) the steering actuator 56 to orient the nose landing gear at an angle $\alpha_2$ that corresponds to the angle $\alpha_1$ sensed by the sensor. In some embodiments, the controller 58 is programmed to determine angle $\alpha_2$ from sensed angle $\alpha_1$ based on values in a lookup table. In some embodiments, the controller 58 is programmed to determine angle $\alpha_2$ from sensed angle $\alpha_1$ by using a mathematical formula. In some embodiments, angle $\alpha_2$ is proportional to sensed angle $\alpha_1$, and the controller 58 is programmed to determine angle $\alpha_2$ by multiplying al by a constant. In some embodiments, the constant is a predetermined constant based at least in part on the geometry of the aircraft landing gear and the position of the connection of the towbar interface 100 with the towbar 30. It will be appreciated that the controller may be programmed to determine an angle $\alpha_2$ corresponding to a sensed angle $\alpha_1$ by any suitable method, and such methods should be considered within the scope of the present disclosure.

When the towing vehicle 20 pushes and pulls the aircraft 50 during ground maneuvers, the angle $\alpha_1$ between the towbar and the aircraft centerline 60 changes as the towing vehicle 20 steers the aircraft. The sensor 130 continuously senses the angle $\alpha_1$ and sends corresponding signals to the controller. The controller 58 controls the nose landing gear actuator 56 to orient the nose landing gear 52 and an angle $\alpha_2$ that corresponds to $\alpha_1$. That is, the controller orients the nose landing gear 52 such that the nose landing gear, the main landing gear 54, and the attachment between the towbar 30 and the towbar interface 100 all maintain a common turn center C.

Figure 6:
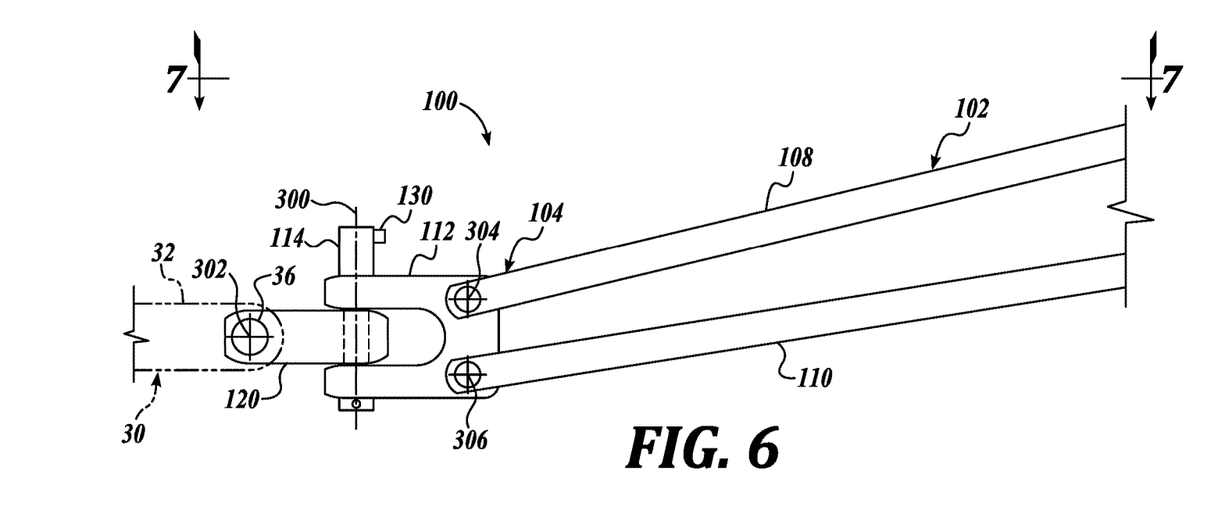
FIG. 6 is a partial side view of the towing interface shown in FIG. 3.
Figure 7:
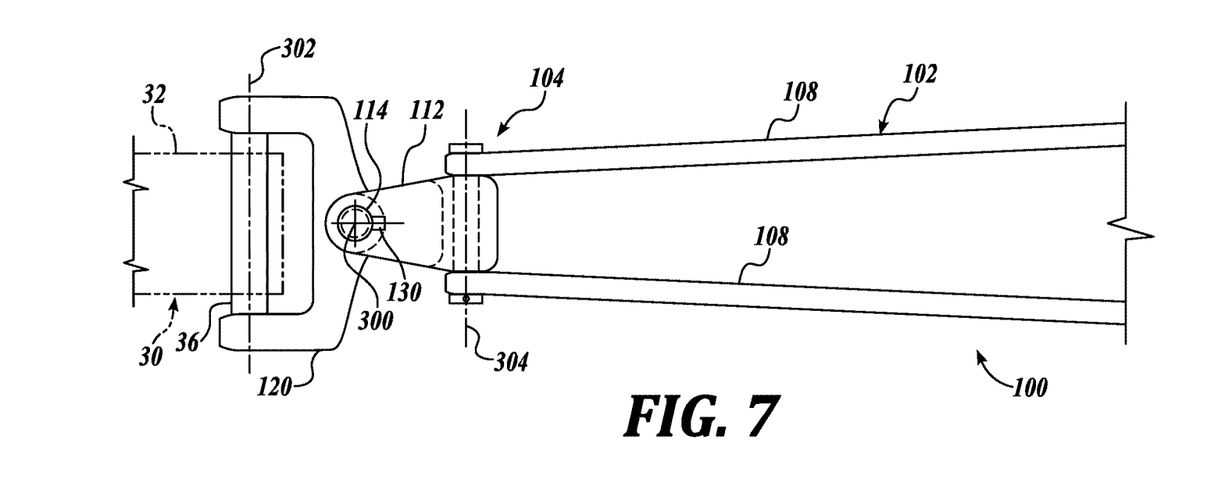
FIG. 7 is a plan view of the towing interface shown in FIG. 6.

Turning now to FIGS. 6 and 7, a portion of an exemplary embodiment of a towbar interface 100 is shown. In the illustrated embodiment, the elongate member 102 includes a pair of upper links 108 and a pair of corresponding lower links 110. A first end of each of the upper and lower links 108 and 110 is rotatably coupled to a clevis 112 about axes 304 and 306, respectively. A second end of each of the upper and lower links 108 and 110 are coupled to the fuselage or some other portion of the aircraft 50. Each upper link 108, its corresponding lower link 106, the clevis 112, and the aircraft 50 act as a 4-bar linkage. Thus, the illustrated elongate member 102 includes two side-by-side 4-bar linkages capable reciprocating movement between the deployed position shown in FIGS. 6 and 7 and the stowed position, in which the elongate member 102 is at least partially disposed within the fuselage of the aircraft.

It will be appreciated that the illustrated elongate member 102 is exemplary only and should not be considered limiting. In this regard, any number of suitable alternatives may be utilized. In some embodiments, the elongate member 102 has a monolithic construction. In some embodiments, the elongate member is selectively detachable from the aircraft 50. In some embodiments, the elongate member is a portion of the aircraft fuselage, i.e., the clevis 112 (or other towbar attachment feature) is mounted directly to the fuselage of the aircraft 50.

While the illustrated towbar interface 100 is shown as a 4-bar linkage that rotates downward from a stowed position to a deployed position, it will be appreciated that any suitable configuration may be employed to enable movement between stowed and deployed positions. Further, some embodiments are contemplated that include a drive mechanism to reciprocate the towbar interface 100 between the stowed and deployed positions. In some embodiments, one or more known actuators drive the towbar interface 100. In some embodiments, the towbar interface 100 is counterbalanced to enable manual deployment and retraction. These and other embodiments are contemplated and should be considered within the scope of the present disclosure.

The clevis 112 is rotatably coupled about a vertical axis 300 to a lug formed on a first end of a coupler 120 by a pin 114. A second end of the coupler 120 has a clevis formed thereon, wherein the clevis is configured to rotatably and detachably couple to a towbar 30 about a horizontal axis 302. A sensor 130 is disposed on the pin 114 and is configured to measure the angle between the centerline 60 of the aircraft 50, directly or indirectly, relative to the centerline of the towbar 30. The illustrated embodiment functions essentially as a universal joint, wherein the perpendicular axes are offset. In addition, the disclosed configuration allows for the sensor 130 to sense the angle between the towbar 30 and the centerline 60 of the aircraft.

It will be appreciated that other configurations are possible to couple the towbar 30 to the aircraft. In this regard, alternative lug and clevis configurations may be included. In some embodiments, a universal joint is disposed between the towbar 30 and the aircraft 50. In some embodiments, the sensor 130 is located in any suitable position and senses the angle between the towbar 30 and the centerline 60 of the aircraft by any suitable means and according to the position or movement of any suitable features of the towbar, aircraft, and/or towbar interface. These and other variations are possible and should be considered within the scope of the present disclosure.

Figure 8:
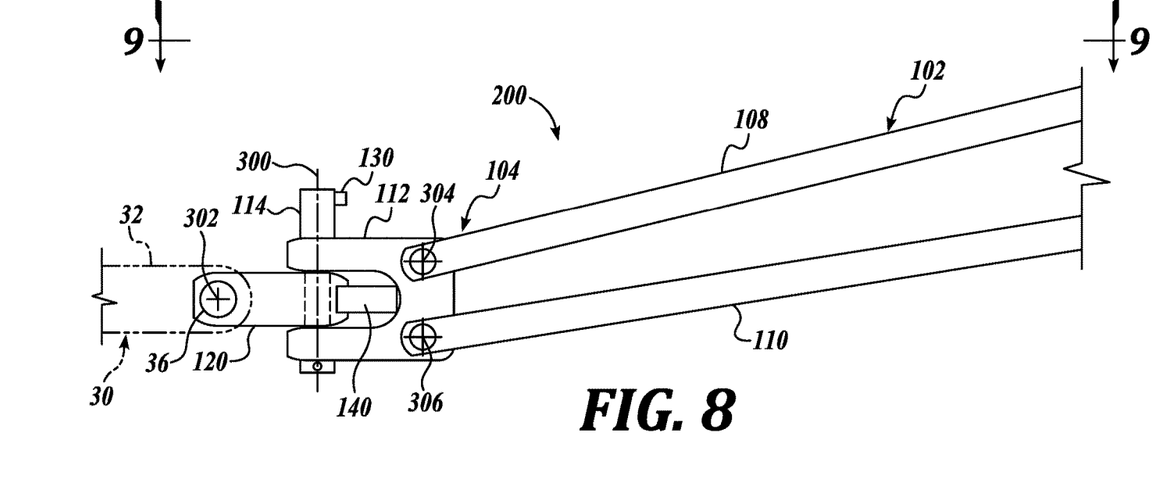
FIG. 8 is a partial side view of a tow of a second representative embodiment of a towing interface according to the present disclosure.
Figure 9:
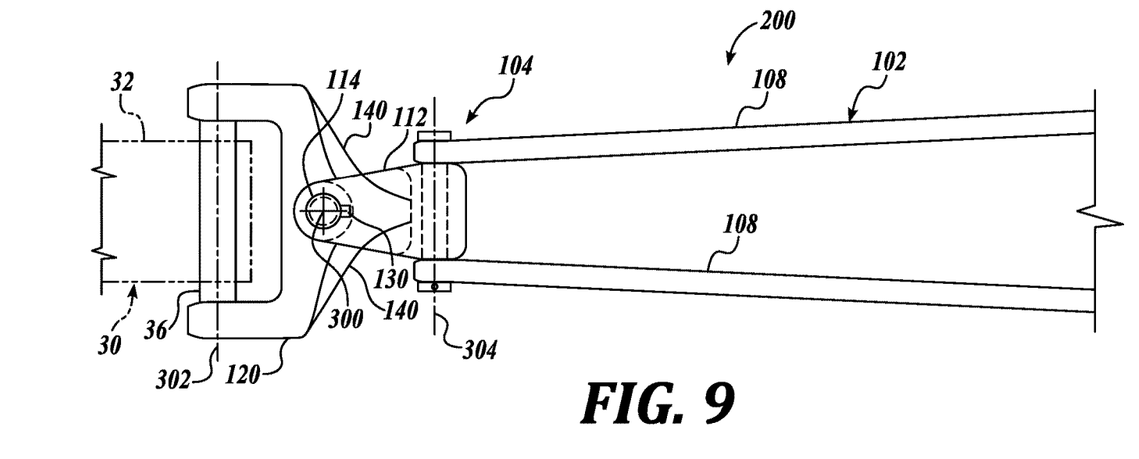
FIG. 9 is a plan view of the towing interface shown in FIG. 8.

Referring now to FIGS. 8 and 9, an alternative embodiment of a towbar interface 200 is shown. The towbar interface 200 shown in FIGS. 8 and 9 is similar to the towbar interface 100 shown in FIGS. 6 and 7, wherein similar components of the have the same reference numbers. The main difference between the embodiments is that towbar interface 200 includes a pair of biasing elements 140 that bias the coupler 120 toward a neutral position. In the illustrated embodiment, the biasing elements 140 are leaf springs that bias the coupler 120 toward the position in which the towbar 30, when attached, is parallel to the centerline 60 of the aircraft. It will be appreciated that other embodiments are possible that utilize different biasing elements, including coil springs, torsion springs, or any other suitable biasing elements. Further, configurations are possible in which the neutral position is not one in which the towbar 30, when attached, is parallel to the centerline 60 of the aircraft.

It will be appreciated that additional variations to the disclosed towbar interface are possible and should be considered within the scope of the present disclosure. In some embodiments, the controller 58 is programmed to prevent over-tow protection. In this regard, the controller is programmed to limit the orientation of the nose landing gear 52 to be less than a maximum steer angle. In some embodiments, the towbar interface is configured provide external power to the aircraft when the engines and Auxiliary Power Unit (APU) are turned off in order to power the controller 58 and the nose landing gear actuator 56. More specifically, the towbar 30 provides electrical power to the towbar interface when connected. For aircraft 50 having a hydraulic actuator 56 the electrical power provided by the towbar interface may power the motor-pump to pressurize the hydraulic fluid.

Certain embodiments disclosed herein utilize circuitry (e.g., one or more circuits) in order to implement methodologies or technologies disclosed herein, operably couple two or more components, generate information, process information, analyze information, generate signals, encode/decode signals, convert signals, transmit and/or receive signals, control other devices, etc. Circuitry of any type can be used. For example, the controller 58 and the sensor 130 can include one or more circuits for carrying out the functionality described herein.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors or portions thereof and accompanying software, firmware, hardware, and the like.

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result. Moreover, some of the method steps can be carried serially or in parallel, or in any order unless specifically expressed or understood in the context of other method steps.

In the foregoing description, specific details are set forth to provide a thorough understanding of exemplary embodiments of the present disclosure. It will be apparent to one skilled in the art, however, that the embodiments disclosed herein may be practiced without embodying all of the specific details. In some instances, well-known method/process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also, in this regard, the present application may use the term "plurality" to reference a quantity or number. In this regard, the term "plurality" is meant to be any number that is more than one, for example, two, three, four, five, etc. The term "about," "approximately," etc., means plus or minus 5% of the stated value For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. An aircraft with a towing interface, the aircraft comprising:
   a fuselage;
   a towbar coupler configured to releasably couple a towbar to the aircraft, wherein an angle of the towbar relative to an aircraft centerline when the towbar is coupled to the towbar coupler defines a first turn angle;
   a sensor configured to sense the first turn angle;
   a steerable landing gear, wherein an angle of the steerable landing gear relative to the aircraft centerline defines a second turn angle;
   an actuator configured to selectively change the second turn angle; and
   a controller communicatively coupled to the sensor and to the actuator, the controller being programmed to control the actuator to change the second turn angle according to the first turn angle so that the first turn angle is greater than the second turn angle when the towbar moves the aircraft through a turn.

2. The aircraft of claim 1, further comprising an elongate member mounted at one end to the aircraft, wherein the towbar coupler is disposed on a second end of the elongate member.

3. The aircraft of claim 2, wherein the elongate member is fixed in rotation about a vertical axis relative to the fuselage.

4. The aircraft of claim 3, wherein the elongate member is selectively rotatable between a stowed position and a deployed position.

5. The aircraft of claim 3, wherein the elongate member is coupled to the fuselage at a location forward of the steerable landing gear.

6. The aircraft of claim 3, wherein the steerable landing gear is a nose landing gear.

7. The aircraft of claim 1, wherein the towbar and the steerable landing gear have a common turn center.

8. The aircraft of claim 1, wherein the towbar coupler is configured to receive power from the towbar.

9. The aircraft of claim 1, wherein the controller is programmed to limit the orientation of the nose landing gear to be within a predetermined range.

10. The aircraft of claim 1, further comprising a biasing element configured to bias the towbar coupler toward a neutral position.

11. An aircraft with a towing interface, the aircraft comprising:
a fuselage,
a landing gear,
an actuator configured to steer the landing gear;
an elongate member mounted at a first end to the fuselage forward of the steerable landing gear, the elongate member extending forward from the first end and being fixed in rotation about a vertical axis relative to the fuselage;
a towbar coupler mounted to a second end of the elongate member, the towbar coupler being configured to releasably couple a towbar to the elongate member;
a sensor configured to sense a position of the towbar relative to the aircraft when the towbar is coupled to the towbar coupler; and
a controller communicatively coupled to the sensor, the controller being programmed to steer the steerable landing gear according to the sensed position of the towbar relative to the aircraft so that when the towbar moves the aircraft through a turn, an angle of the towbar relative to a centerline of the aircraft is greater than a steering angle of the steerable landing gear.

12. The aircraft of claim 11, wherein an angle of the towbar relative to the aircraft centerline defines a first turn angle, and an angle of the steerable landing gear relative to the aircraft centerline defines a second turn angle, wherein the controller controls the second turn angle according to the first turn angle.

13. The aircraft of claim 12, wherein the controller controls the second turn angle according to the first turn angle so that the towbar and the steerable landing gear have a common turn center.

* * * * *